May 21, 1963
B. C. THOMSON
3,090,185
CANE HARVESTER AND PILERS AND PROCESS FOR
HARVESTING AND PILING CANE
Filed April 30, 1959
7 Sheets-Sheet 1
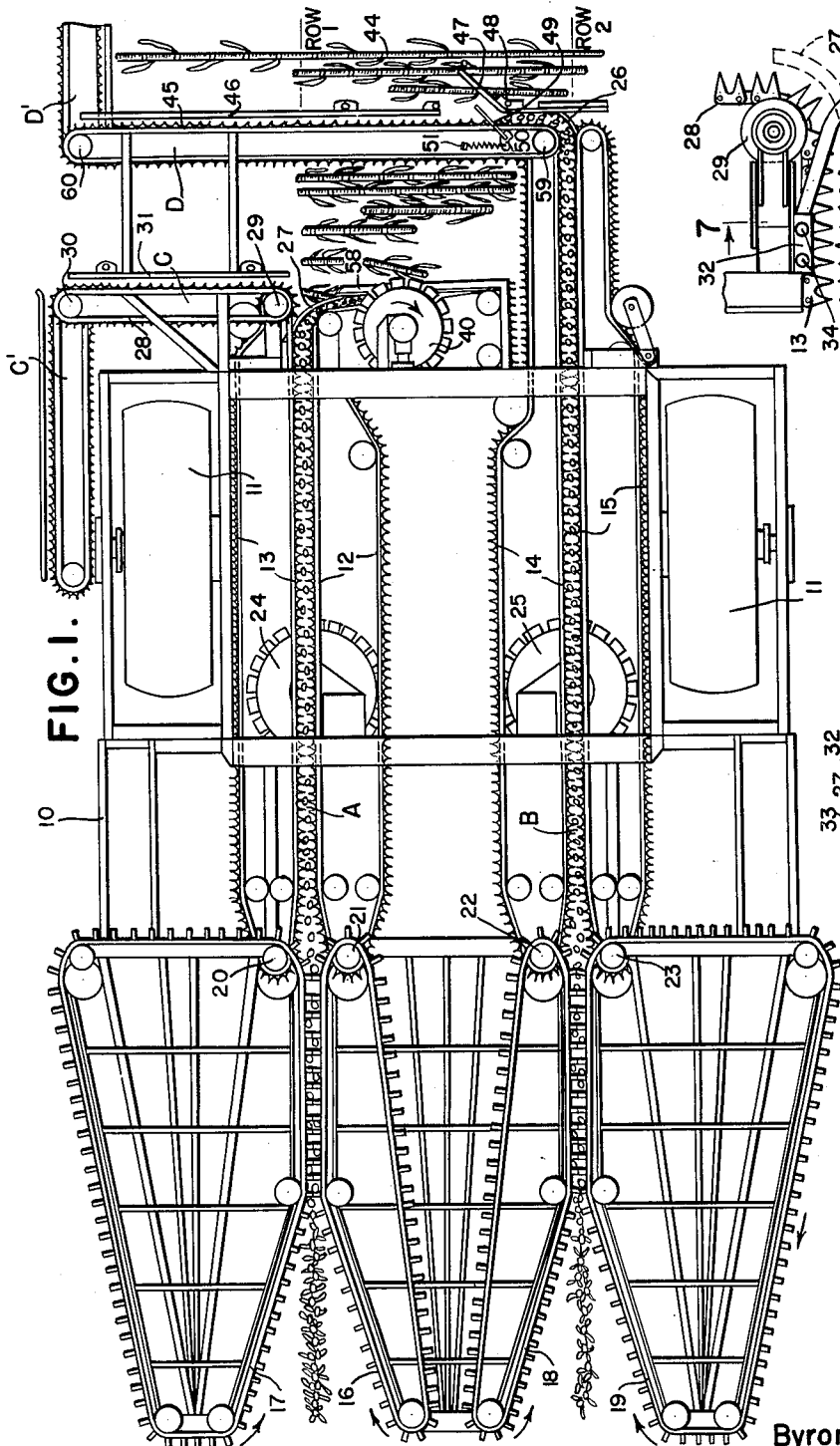
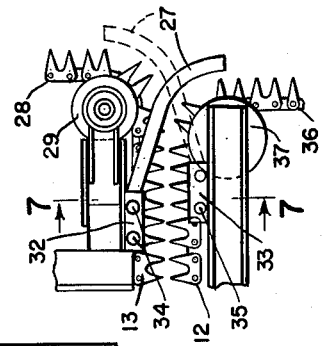
FIG. 6.
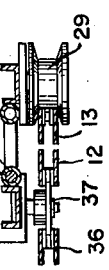
FIG. 7.
INVENTOR
Byron C. Thomson
BY Wilkinson, Mawhinney & Theibault
ATTORNEYS

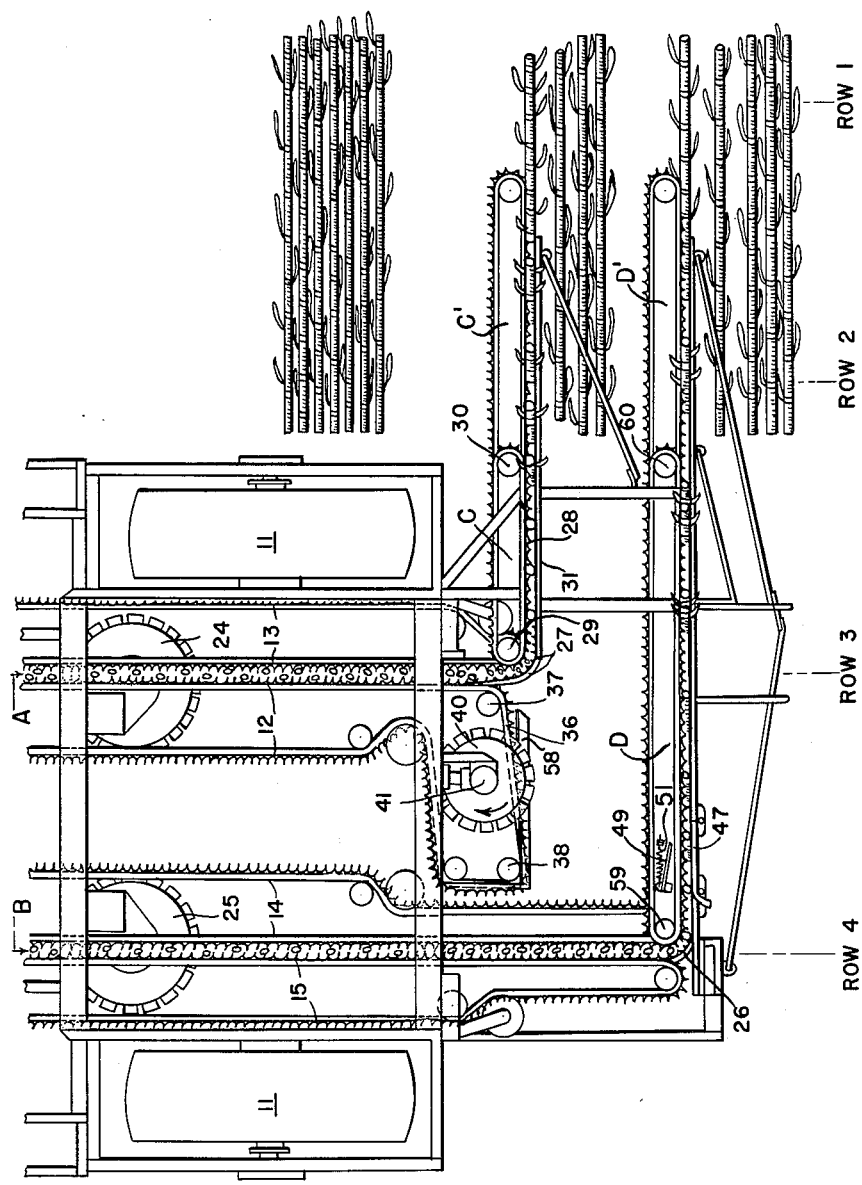

May 21, 1963
B. C. THOMSON
3,090,185
CANE HARVESTER AND PILERS AND PROCESS FOR
HARVESTING AND PILING CANE
Filed April 30, 1959
7 Sheets-Sheet 4
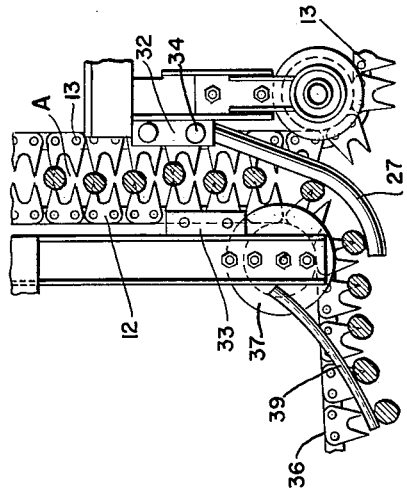
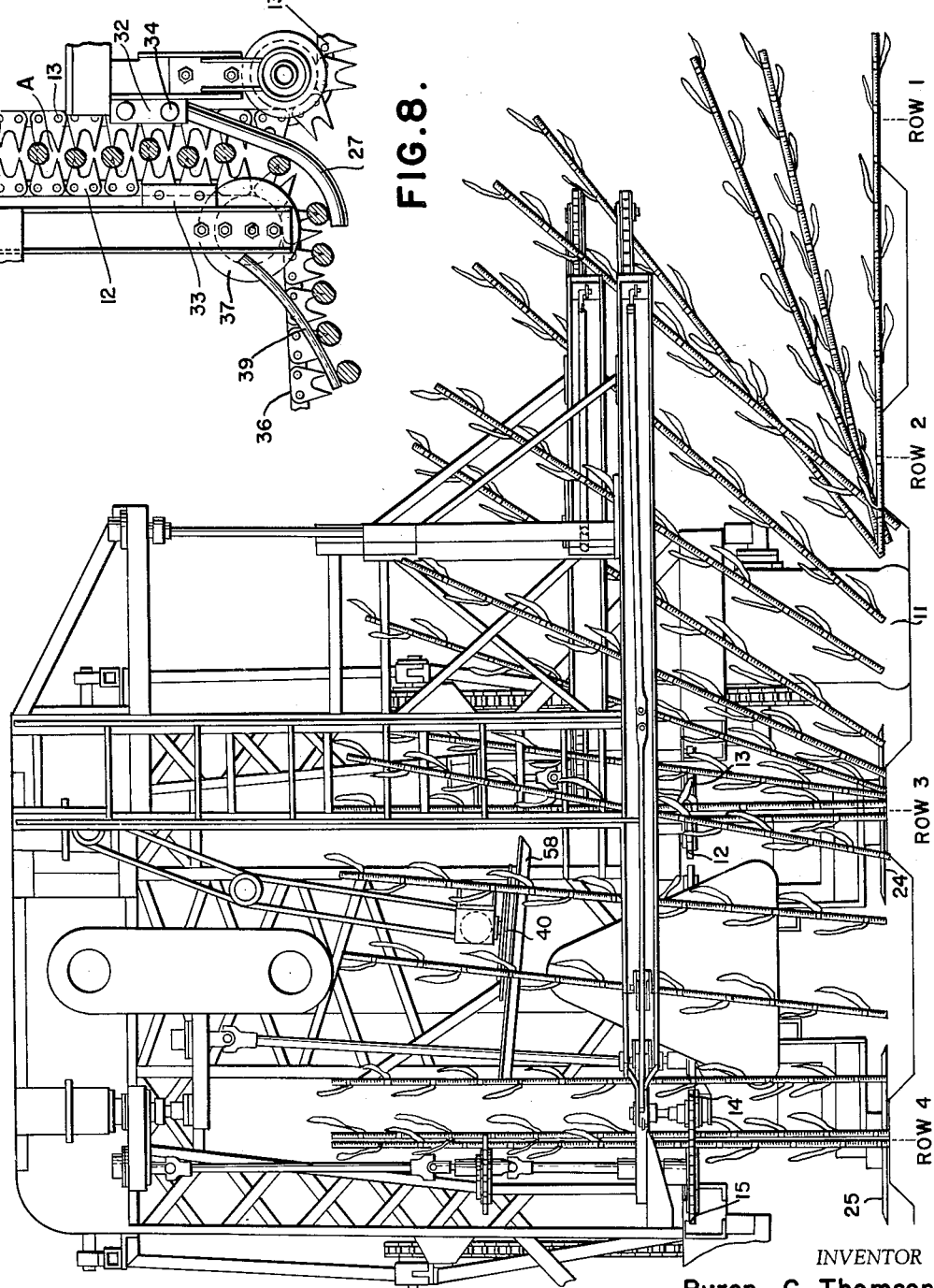
INVENTOR
Byron C. Thomson
BY *Wilkinson Mawhinney & Theibault*
ATTORNEYS INVENTOR
Byron C. Thomson

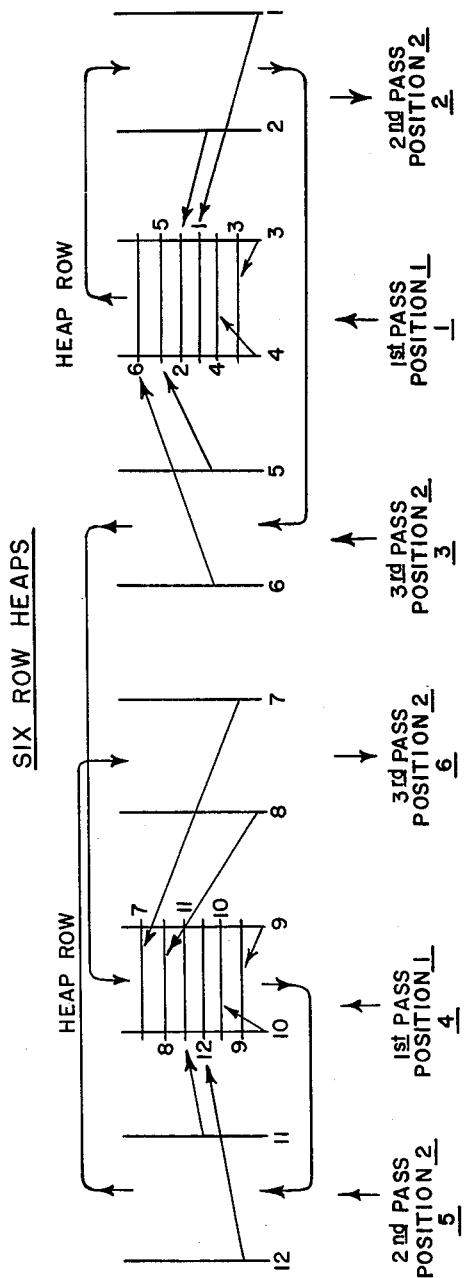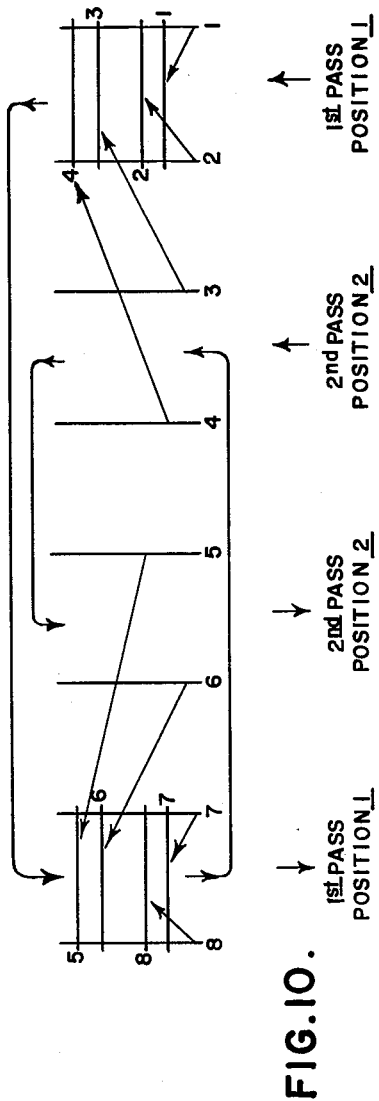

United States Patent Office 3,090,185
Patented May 21, 1963

3,090,185
CANE HARVESTER AND PILERS AND PROCESS FOR HARVESTING AND PILING CANE
Byron C. Thomson, Thibodaux, La., assignor, by mesne assignments, to Lamb Industries, Inc., Toledo, Ohio, a corporation of Delaware
Filed Apr. 30, 1959, Ser. No. 810,104
4 Claims. (Cl. 56—17)

The present invention relates to cane harvester and pilers and process for harvesting and piling cane.

An object of the invention is to provide a cane harvester constructed and arranged to cut two rows of cane stalks simultaneously and to pile the same in heap rows to the end that the capacity of the harvester is substantially increased, thus insuring adequate supply of cane for the mills at all times during the grinding season.

Another object of the invention is to provide a process for achieving the results related in the foregoing paragraph.

A further object of the invention is to provide novel forms of duplex pilers in association with the two-row harvester for piling cane issuing from the two longitudinal cane channels of the harvester upon the same heap row identified by the two hills being harvested.

A still further object of the invention is to provide a harvester having at least two stalk-receiving channels for cutting at least two rows of cane stalks simultaneously and delivering the same to transverse pilers which are located at longitudinally spaced-apart points at the rear end of the harvester.

A still further object of the invention is to provide a novel process of "opening" a square by cutting two rows of cane stalks simultaneously and providing for their disposition in heap rows supported by the hills of the cane stalks just harvested on "opening" the square, the stalks being allowed to fall together in opposite lateral directions without the necessity of creating any "leaning" rows which according to present practice have to be later thrown by hand or machinery over onto the heap rows.

The invention is particularly applicable to cane grown in the tropics which grows to a greater height than domestic cane and much of it falls on the ground in a tangled mass so that a cane harvester must travel at a much slower speed in order to lift these recumbent and tangled canes into the harvester without breaking them. If only one row is cut at the slower speed the capacity of the harvester would be greatly reduced. By cutting two rows of cane simultaneously, the same capacity may be maintained at one-half the speed. If the cane happens to be straight, the capacity of a 2-row harvester may be doubled.

The type of pilers used may be that disclosed in my prior Patent No. 2,427,313, granted September 9, 1947.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a top plan view of a harvester and pilers constructed in accordance with the present invention and illustrating the first pass through the field establishing a heap row on the two hills from which cane at the time is being harvested;

FIGURE 2 is a fragmentary top plan view of a harvester of this invention illustrating the same on a subsequent pass with the two cane pilers in position transferring the currently cut cane onto the initial established heap row;

FIGURE 4 is a view similar to FIGURE 3 with the two cane pilers supplied and in extended position with the machine straddling two subsequent rows but moving the cane out to the initial established heap row;

FIGURE 6 is an enlarged fragmentary plan view of the discharge end of the right channel showing in full lines the initial position of the deflector bar used on the first pass, and in dotted lines the reverse position of the deflector bar for bypassing the cane stalks to the forward cane piler;

FIGURE 7 is a vertical transverse sectional view taken on the line 7—7 in FIGURE 6;

FIGURE 8 is an enlarged fragmentary plan view of the rear discharge end of the right or "off" channel showing the deflector bar and also the camming bar for prying the cane stalks loose from the "sticker" chain;

FIGURE 10 is a schematic or diagram showing the order of movement of the harvester in the case of 4-row heaps, and FIGURE 11 is a similar view with respect to 6-row heaps.

Figure 3:
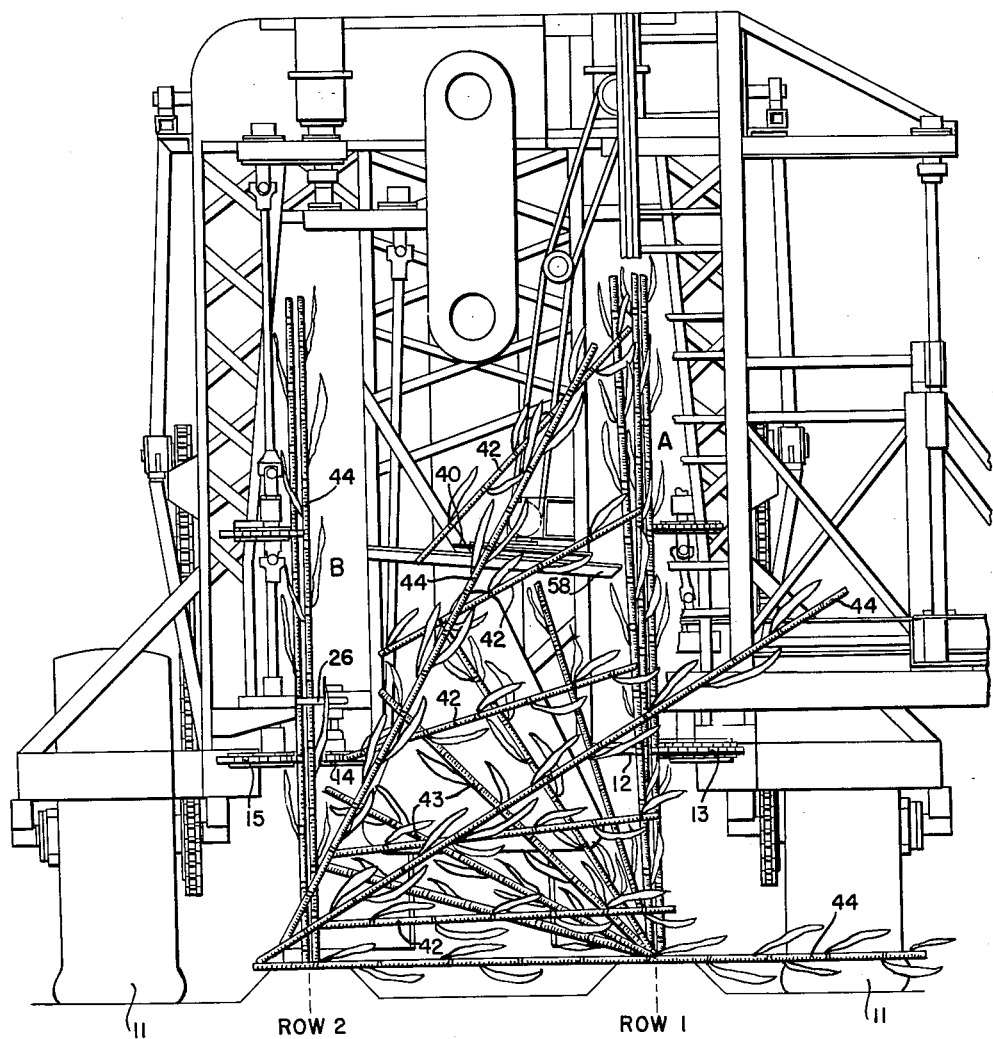
FIGURE 3 is a rear end elevational view of the harvester with the pilers removed showing the same straddling two rows and illustrating the fall of the cane in opposite directions and the cutter for severing the stalks issuing from the right or "off" cane channel; this view showing an initial pass of the machine "opening" the square.

Referring more particularly to the drawings, 10 designates generally a harvester frame of a width to span two rows and supported as to its main weight and driven by the rear wheels 11 which are adapted to travel in the furrows outside of these two rows, which rows are identified in FIGURE 3 as Row 1 and Row 2, and in FIGURE 4 as Row 3 and Row 4.

Passing longitudinally through the harvester frame 10 and substantially parallel to one another are at least two cane-receiving channels A and B spaced laterally from one another at the approximate distance of adjacent cane rows. Moving rearwardly through these channels A and B are the near runs of "sticker" or other chains 12, 13, 14 and 15.

In the forward ends of the harvester are the usual gathering chains 16, 17, 18 and 19 which lift and erect any fallen or bent cane and otherwise guide the stalks of the two rows into the channels A and B.

These various chains may be driven in any suitable manner, for instance, from substantially vertical shafts 20, 21, 22 and 23 which derive their power from power sources on the harvester frame 10 and which drive the several chains through sprockets affixed to said shafts.

The cane stalks are cut near the ground by the conventional rotary cutters 24 and 25.

With reference to the direction of movement of the harvester through the field, the channel A is the right or "off" channel and channel B is the left channel. By "off" is meant the channel on the side of the harvester away from the standing cane. The left channel B is adjacent the standing cane and this channel is longer than the right channel A and it extends farther rearwardly than the channel A so that the discharge end of the left channel B is offset a distance from the rear discharge end of the right channel A sufficient to accommodate the deposit of cut cane stalks from the right channel A upon the heap row in advance of deposit of the cane stalks from the rear discharge end of the left channel B.

Curved deflector bars 26 and 27 are mounted on the harvester frame at the rear discharge ends respectively of the channels B and A. These deflector bars 26 and 27 are so shaped as to direct the discharged cane stalks laterally and preferably at substantially right angles to the path of movement of the machine through the field; or otherwise stated, crosswise of the hills or rows.

The cut cane stalks are thus diverted to forward and rear cane pilers C and D, the receiving ends of which are disposed close to the rear discharge ends of the channels A and B. These cane pilers C and D may follow rather closely the construction disclosed in my prior Patent 2,427,313 aforesaid. For instance, the piler C comprises a "sticker" chain 28 running over sprockets or sheaves 29, 30 and operating in conjunction with a pressure bar 31 spaced from the rear run of the chain 28. These sprockets 29 and 30 are mounted for rotation in suitable parts of the framework 10 and connected to be driven, for instance, as shown in FIGURE 3 of my said prior patent. An extension section C' of the cane piler C pivots or hinges around the center of the sprocket 30. The rear end of the carrier chain 13 runs about a sprocket on the same center as the sprocket 29 for the piling chain 28 so that there is smooth transfer of the cane stalks from the right channel A to the space between the pressure bar 31 and the rear run of the piler "sticker" chain 28.

As shown more particularly in FIGURES 6, 7 and 8, the curved deflector bar 27 is removably and adjustably fitted at its forward end selectively into sockets 32 and 33 mounted on the machine framework or the piler framework carried by the machine whereby the deflector bar 27 may be inserted in either socket 32 and 33, being reversed in position as shown relatively in full and dotted lines in FIGURE 6. When in the dotted position the deflector bar will deflect the cut cane from the right channel A directly into the piler C.

Set screws or the like 34 and 35 may be employed to secure the shank of the deflector bar 27 after adjustment in the selected socket 32, 33.

When in the full line position shown in FIGURES 1, 6, 8 and 9, the deflector bar 27 will direct the cut cane stalks issuing from the right channel A laterally toward the standing cane, i.e., toward the companion cane channel B and along a lateral extension 36 of the "sticker" chain 12 which runs over the sprockets or sheaves 37, 38, as best seen in FIGURE 2.

As shown in FIGURE 8, a cam bar 39 is mounted on the frame in overlapping relation to the lateral chain run 36 so as to force or pry the cane stalks from the "sticker" chain just before these cane stalks are fed into the rotary knife or cutter 40 mounted to rotate about and be driven by a substantially vertical shaft 41 receiving power from an appropriate source on the machine. A cutter bar 58 is mounted adjacent the rotary cutter 40 for holding the cane in firm position against such rotary cutter bar in order to effectively cut the stalks.

Figure 5:
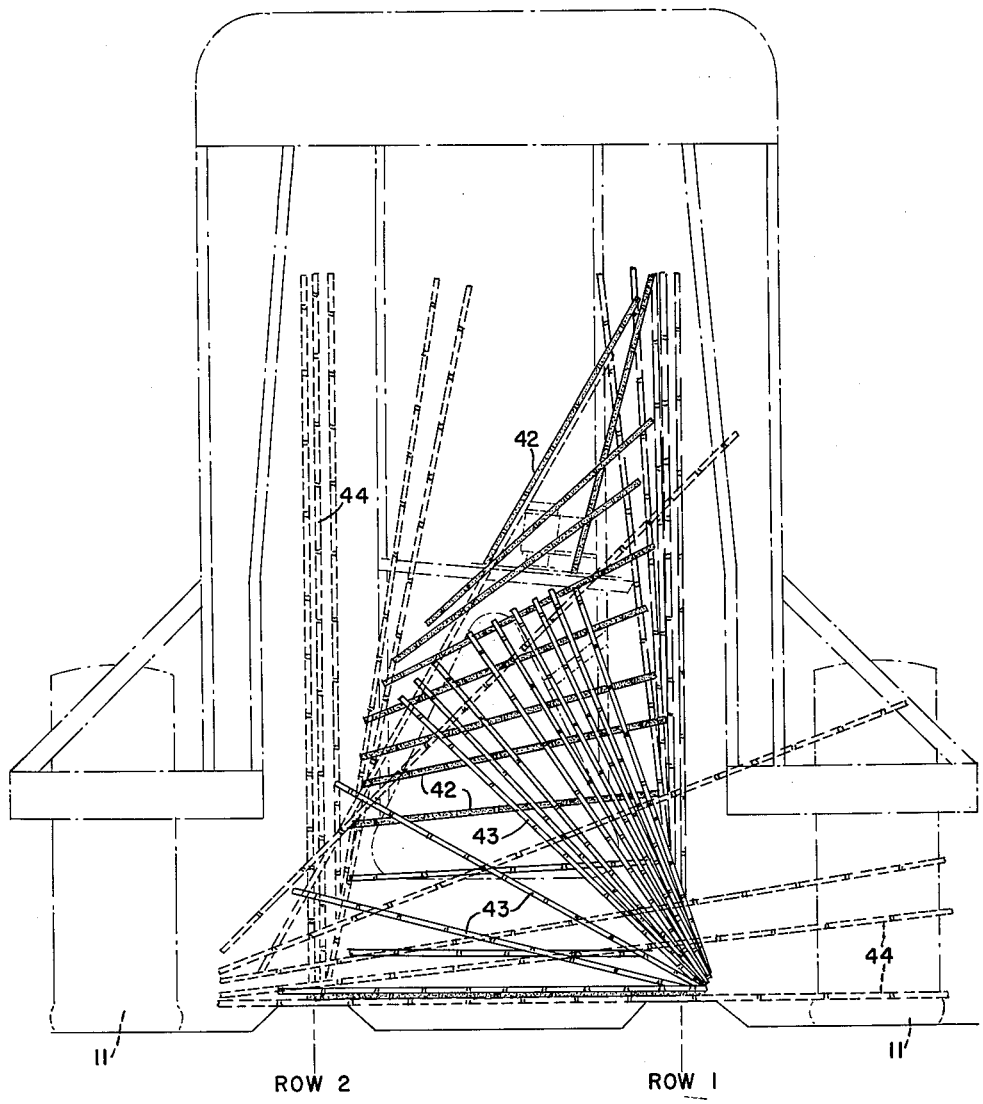
FIGURE 5 is a diagrammatic rear elevational view illustrating the fall of the cut cane and the cutter action with reference to the cane issuing from the right or "off" channel.

It will be noted from FIGURES 3 and 4 that the height, which may be adjusted, of the cutter 40 and cutter bar 58 is intermediate the lengths of the cane stalks issuing from the right channel A. This knife 40 travels in the direction of the arrows in FIGURES 1 and 2, and it performs two functions. First, it severs the cane stalks, and in the second place, in so severing the stalks it delivers a lateral blow to the same in the direction in which the stalks are moving, or in other words, in the direction toward the companion cane channel B, thus severing these stalks into upper sections 42 and lower sections 43 with the lower sections receiving the blow at their upper ends and thus being induced to rotate about their lower ends on the hill designated Row 1 (FIGURE 5) and thus fall over between Row 1 and Row 2.

The blow or thrust delivered by the rotary cutter 40 to upper sections 42 of the cut cane is at the lower ends thereof, thus tending to drive these lower ends in the direction of the hill denominated Row 2 and inducing a falling movement of these upper sections 42 about their lower ends in a direction crosswise of the rows and towards the right channel A. Thus, the cutter 40 not only severs the cane delivered to it from the right channel A, but it also promotes a "folding" movement in this cane causing both sections to descend between the hills denominated Row 1 and Row 2, thus establishing an initial heap row.

The canes 44 from the left channel B are deflected by the deflector bar 26 into the rear piler D, and its pivoted extension D', which also preferably consists of a "sticker" chain 45, rotating about sprockets 59, 60, and a companion pressure bar 46. As shown more particularly in FIGURES 1 and 9, at a point near the deflector bar, a section 47 of the pressure bar 46 is cut out to provide a gate pivoted at 48 to the frame and adapted to swing to the open position of FIGURES 1 and 9 or the closed position of FIGURE 2. In association with this gate 47 is a deflector bar 49 pivoted at 50 and biased to the inclined position of FIGURES 1 and 9 by a light coil spring 51. In the closed position of the gate, as shown in FIGURE 2, the cane may simply rock the deflector bar 49 out of the way in passing along the channel between the piler chain 45 and the pressure bar 46.

Figure 9:
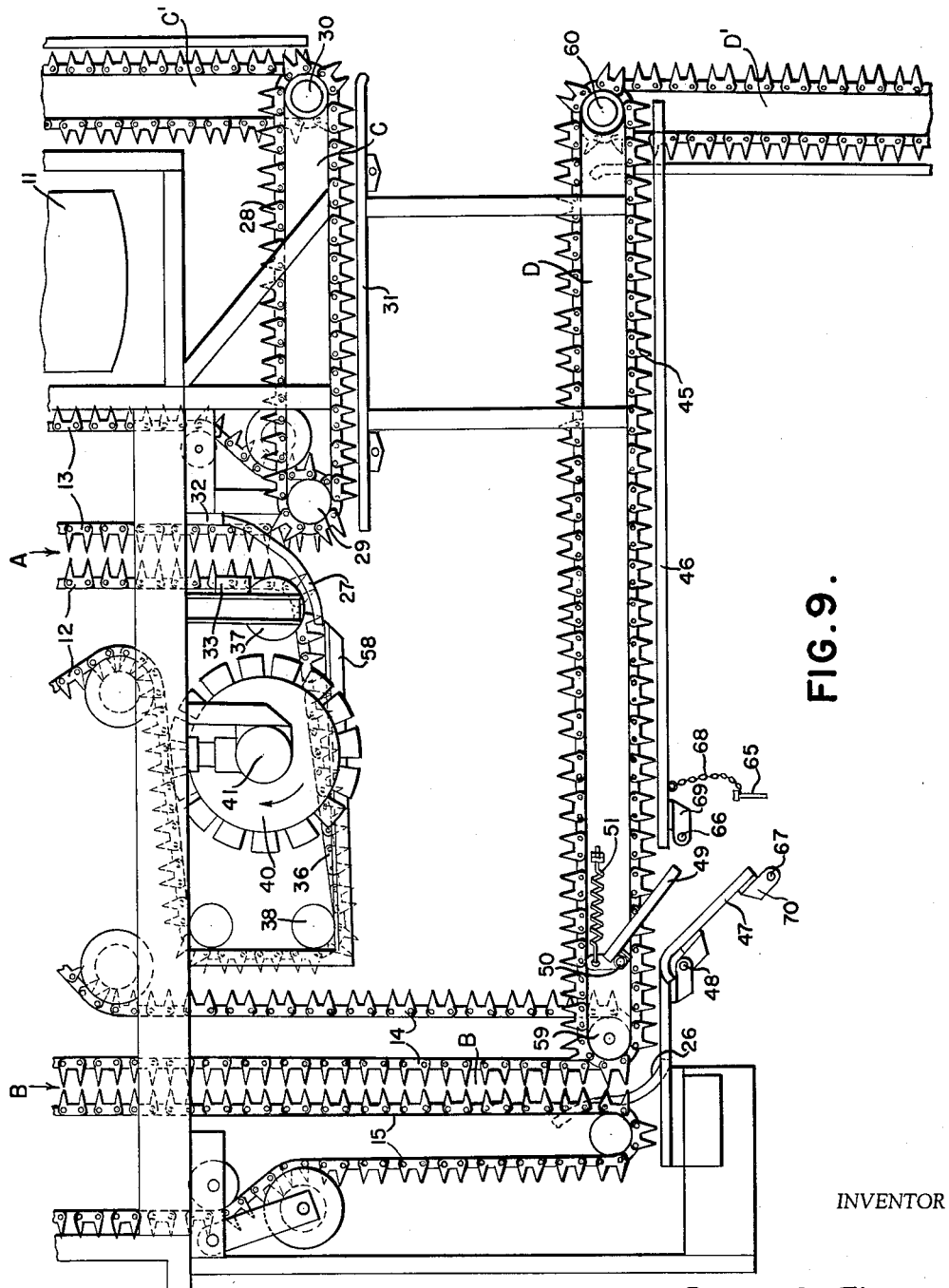
FIGURE 9 is a top plan view on an enlarged scale of the rear portion of the harvester.

As shown more particularly in FIGURE 9, a locking pin 65 which may be attached by a chain 68 to the pressure bar 46 or other part is adapted to be inserted through holes 66 and 67 in brackets 69 and 70 attached respectively to the pressure bar 46 and the free end of the pivoted gate 47 in the closed position of the gate when the perforations or holes 66 and 67 are in registry. The pin 65 thus retains the gate 47 in the closed position in which it forms a continuation of the pressure bar 46; whereby the cane stalks can be passed along the full length of the section D of the rear piler and onto the similar extension D' when the same is swung out to the extended position shown in FIGURE 2, it being understood, as shown in FIGURES 1 and 9, that the extension sections C' and D' of the two pilers C and D are folded or rotated respectively forwards and rearwards through approximately ninety degrees about the centers of the sprockets 30 and 60. The extension C' is folded forwardly against the side of the harvester and the section D' extends rearwardly of the harvester within the confines of the section C'. The object of thus folding these two sections C' and D' is to prevent the extended sections from knocking down cane immediately adjacent to the harvester when cutting the first two rows either for a 4-row or 6-row heap, or for road travel.

In operation, referring to FIGURES 1 and 3, the harvester is shown as straddling Row 1 and Row 2. The gate 47 is open and the tall cane from left channel B is deflected out by the deflector bar 49 through the gap provided by the open gate 47. Thus this long cane 44 is induced to fall laterally down until it rests across Row 1 and Row 2.

While the tall cane in channel B is being severed at the bottom and piled as stated through the gate 47 into the initial heap row established by Row 1 and Row 2, cane is also being harvested in channel A and severed from the ground by the rotary cutter 24 and also being delivered to the rotary cutter 40 which cuts the right channel cane in two sections 42 and 43, causing these sections to "fold" in the manner above stated and be deposited upon the same heap row forwardly of the deposit of the canes 44, but both being deposited in the same initial heap row.

An important function of this two-row harvester is that it will not only make a 4-row heap but also a 6-row heap at the option of the operator. Diagrams of the positions and passes of the harvester into and through a "square" or part of a "square" are illustrated in FIGURES 10 and 11. It will be understood that in cutting the first two rows of either a 4-row or 6-row heap, the canes of these two rows are always dropped immediately behind the harvester as will be further described under Position 1 below. The next two or four rows cut, depending upon whether there is a 4-row or 6-row heap made, the harvester is always in Position 2, as described below:

*Position 1.*—In Position 1 the far ends or extensions C' and D' of both pilers C and D are not in extended position, but are in the positions shown in FIGURES 1 and 9, as heretofore described. At this time the deflector bar 27 of channel A is turned or placed in a position to direct the cane away from the piler C toward the revolving cutter 40 and cutter bar 58, all as shown in FIGURES 1, 6 and 9. The gate 47 on piler D is in the open position and the deflector bar 59 is turned by the spring 51 across the passage of piler D. Position 1 is shown in FIGURES 1, 3, 5, 6, 8 and 9 and is used always when cutting the first two rows of either a 4-row or 6-row heap. When in Position 1, the cane from channel A will be turned by deflector bar 27 away from the piler C toward the revolving cutter 40 so that it will be cut in two pieces in order to fall in the space between Rows 1 and 2. The cane from channel B will enter piler D and pass through the open gate 47 pushed out by the deflector bar 49 which is automatically biased to the cross position by spring 51 when the gate 47 is unlatched. This allows the cane from channel B to fall on the ground immediately behind and on top of the cane from channel A and completes the first two rows of a heap row.

*Position 2.*—In Position 2 the far ends or extensions C' and D' of both pilers are swung around on the pivots 30 and 60 to extended positions, as indicated in FIGURE 2, so that all cane from both channels A and B will enter both pilers C and D and travel through them to their outer ends. The deflector bar 27 on channel A will be turned toward piler C and the gate 47 will be closed and latched by the pin 65. Position 2 is shown in FIGURES 2, 4 and 6 (dotted line) and is used always when cutting the third and fourth rows of a 4-row heap and the fifth and sixth rows of a 6-row heap, as shown in FIGURES 10 and 11. When in Position 2, the cane from channel A enters piler C and is carried through this piler to the end where it is ejected on top of the cane from Rows 1 and 2. The cane from channel B enters piler B and proceeds through this piler to the end where it is dropped on the cane from Rows 1, 2 and 3.

Pursuant to conventional practice a square is "opened" by moving the conventional single row harvester through the field in a position to cut the row next to the end row. There being no place to pile such cane originally, the cane is leaned against the standing end row and must be dealt with subsequently by hand or machine to throw it over into the later established heap row which is not established until the second pass of the machine. Pursuant to the invention the leaning row is eliminated because two rows are being cut at the same time according to the invention and, consequently, two hills are immediately available for laying across thereof the cane stalks in an immediately established heap row. Also, it is possible with the duplex channel machine of this invention to cut and harvest the end row and the row immediately adjacent thereto in "opening" the square, the cane from the end row being thrown inwardly of the square after being severed in two sections so that it remains on the field and is supported by the end row and the row adjacent thereto, from which rows cane has been simultaneously cut by this two-row harvester.

The process can be carried out by other forms of machines or by hand.

Although I have disclosed herein the best form of the invention known to me at this time, I reserve the right to all such modifications and changes as may come within the scope of the following claims.

What is claimed is:

1. A cane harvester comprising a harvester frame, at least two substantially parallel longitudinally extending cane receiving channel structures in the frame laterally spaced at the approximate distance of adjacent cane rows and having rear discharge ends, one of said channel structures being longer than the other whereby the rear discharge ends terminate at longitudinally spaced points, lateral deflector means on the frame positioned at the discharge ends of the channel structures for directing the cane stalks issuing from each channel structure in a lateral path toward the other channel structure whereby the stalks from the longer channel structure fall laterally across the two hills being harvested in a heap row, and a laterally moving cutter on the frame in the lateral path of such stalks issuing from the deflector means at the discharge end of the shorter channel structure for cutting the stalks in two sections and at the same time driving the cut ends of such stalk sections toward the longer channel structure.

2. A cane harvester as claimed in claim 1 in which the cutter is rotary on an upright axis forward of the lateral path of the stalks issuing from the discharge end of the shorter channel structure with the effective cutting portion of the cutter rotating toward the longer channel structure.

3. A cane harvester as claimed in claim 1 further comprising severing means on the frame for severing the butt ends of the stalks of both channel structures close to ground line, said severing means being independent of the laterally moving cutter and forward of such cutter whereby the canes are severed before being cut into sections by the cutter.

4. A cane harvester as claimed in claim 1 further comprising means on the frame at opposite sides of the discharge end of the shorter channel structure for detachably and reversibly receiving the deflector means to direct the uncut canes from the shorter channel structure in an opposite lateral path from that previously stated for delivery to the heap row on a second pass of the harvester through a second set of two rows.

References Cited in the file of this patent

UNITED STATES PATENTS

| | | |
|---|---|---|
| 833,986 | Tilson | Oct. 23, 1906 |
| 1,278,644 | Hazenhyer | Sept. 10, 1918 |
| 1,823,387 | Campbell | Sept. 15, 1931 |
| 2,427,313 | Thompson | Sept. 9, 1947 |
| 2,516,277 | Vichie et al. | July 25, 1950 |
| 2,532,904 | Guild | Dec. 5, 1950 |
| 2,592,270 | Getz | Apr. 8, 1952 |
| 2,599,143 | Thompson | June 3, 1952 |
| 2,840,973 | Thompson et al. | July 1, 1958 |